(12) United States Patent
Ota et al.

(10) Patent No.: US 7,966,985 B2
(45) Date of Patent: Jun. 28, 2011

(54) VALVE OPERATING SYSTEM AND ENGINE INTAKE CONTROL SYSTEM

(75) Inventors: Shigehiko Ota, Tochigi (JP); Fumio Kawamata, Tochigi (JP); Makoto Hirata, Tochigi (JP); Takashi Fukuda, Tochigi (JP)

(73) Assignee: Keihin Corporation, Tokyo (JP)

( * ) Notice: Subject to any disclaimer, the term of this patent is extended or adjusted under 35 U.S.C. 154(b) by 574 days.

(21) Appl. No.: 12/139,250

(22) Filed: Jun. 13, 2008

(65) Prior Publication Data

US 2008/0314348 A1 Dec. 25, 2008

(30) Foreign Application Priority Data

Jun. 15, 2007 (JP) ................................. 2007-159377

(51) Int. Cl.
*F02M 35/10* (2006.01)
(52) U.S. Cl. ............. 123/184.55; 123/184.51; 180/68.1; 180/68.2; 180/68.3; 74/469; 74/471 R; 74/479.01; 251/279; 251/213
(58) Field of Classification Search ............. 123/184.21, 123/184.47–184.49, 184.51–184.57, 184.61, 123/184.34–184.36, 184.42–184.44, 336, 123/337; 74/469, 471 R, 479.01; 251/231, 251/232, 279
See application file for complete search history.

(56) References Cited

U.S. PATENT DOCUMENTS

| | | | | |
|---|---|---|---|---|
| 4,053,542 A * | 10/1977 | Niebrzydoski | ............... | 261/23.2 |
| 4,384,559 A * | 5/1983 | Tchang et al. | ................ | 123/332 |
| 4,890,586 A * | 1/1990 | Fujii et al. | ................ | 123/184.55 |
| 5,495,834 A * | 3/1996 | Rutschmann et al. | ... | 123/184.31 |
| 6,422,201 B1 * | 7/2002 | Yamada et al. | ............... | 123/336 |
| 6,481,415 B1 * | 11/2002 | Cook | ............................ | 123/400 |
| 7,389,758 B2 * | 6/2008 | Yokoi | ....................... | 123/184.55 |
| 7,533,645 B2 * | 5/2009 | Fujiwara et al. | ......... | 123/184.55 |
| 7,730,865 B2 * | 6/2010 | Yokoi | ....................... | 123/184.55 |
| 7,806,212 B2 * | 10/2010 | Sudoh et al. | ................. | 180/68.3 |

FOREIGN PATENT DOCUMENTS

JP 7-224670 A 8/1995

* cited by examiner

*Primary Examiner* — Michael Cuff
*Assistant Examiner* — Hung Q Nguyen
(74) *Attorney, Agent, or Firm* — Arent Fox LLP (57) ABSTRACT

A valve operating system that includes a drive shaft, a drive lever that is fixedly provided thereon and can pivot in a direction of movement of a valve body, a follower arm that is fixedly provided on the valve body, a link, a first connecting shaft that connects one end of the link and the drive lever, and a second connecting shaft that connects the other end of the link and the follower arm; in response to a movement of the valve body from a first position to a second position by pivoting of the drive lever, a center of the first connecting shaft approaches from one side a straight line connecting two centers of the drive shaft and the second connecting shaft, and after the valve body reaches the second position, further pivoting of the drive lever is carried out through a predetermined angle so that the center of the first connecting shaft moves to the other side of a dead point on the straight line. Thereby a valve body can be held at one position with hardly any dependence on the output of an actuator, thus greatly reducing the load on the actuator.

5 Claims, 9 Drawing Sheets

VALVE OPERATING SYSTEM AND ENGINE INTAKE CONTROL SYSTEM

BACKGROUND OF THE INVENTION

1. Field of the Invention

The present invention relates to a valve operating system in which a valve body is mounted on a supporting member so as to move between predetermined first and second positions, and the valve body is operated by an actuator, and an engine intake control system comprising the valve operating system.

2. Description of the Related Art

Such an engine intake control system is already known, as disclosed in Japanese Patent Application Laid-open No. 7-224670.

In such a valve operating system, even after the actuator moves the valve body to the first position or the second position by means of its output, it continues to exert a large output in order to hold it that position, and the load on the actuator is therefore high.

SUMMARY OF THE INVENTION

The present invention has been accomplished in view of such circumstances, and it is an object thereof to provide a valve operating system that enables a valve body to be held at one position with hardly any dependence on the output of an actuator, thus greatly reducing overall load on the actuator, and an engine intake control system comprising the valve operating system.

In order to achieve the object, according to a first feature of the present invention, there is provided a valve operating system in which a valve body is mounted on a supporting member so as to move between predetermined first and second positions, and the valve body is operated by an actuator, wherein the valve operating system comprises a drive shaft that is rotatably supported on the supporting member and connected to the actuator, a drive lever that is fixedly provided on the drive shaft and can pivot in a direction of movement of the valve body, a follower arm that is fixedly provided on the valve body, a link, a first connecting shaft that pivotably connects one end of the link and the drive lever, and a second connecting shaft that pivotably connects the other end of the link and the follower arm; in response to a movement of the valve body from the first position to the second position by pivoting of the drive lever, a center of the first connecting shaft approaches from one side a straight line connecting two centers of the drive shaft and the second connecting shaft, and after the valve body reaches the second position, further pivoting of the drive lever is carried out through a predetermined angle so that the center of the first connecting shaft moves to the other side of a dead point on the straight line.

The support corresponds to an intake manifold M in an embodiment of the present invention, which will be described below.

With the first feature of the present invention, after the valve body is moved to the first position by the output of the actuator, by further pivoting the drive lever through the predetermined angle so that the center of the first connecting shaft moves to the other side of the dead point on the straight line connecting the centers of the drive shaft and the second connecting shaft, the valve body can be locked in the second position. It is thus possible to eliminate or reduce the output of the actuator when holding the valve body in the second position, and the load on the actuator is greatly reduced, thus serving for energy saving.

According to a second feature of the present invention, in addition to the first feature, a portion that abuts against the valve body so as to define the second position is formed resilient, and said portion is compressively changed in shape in response to movement of the center of the first connecting shaft to the other side of the dead point on the straight line.

The portion corresponds to a funnel member 4a in the embodiment of the present invention, which will be described below.

With the second feature of the present invention, as the center of the first connecting shaft moves to the other side of the dead point on the straight line, the force of repulsion of the portion from the compression acts on the drive lever, thus suppressing uncontrolled movement thereof, and it is thus possible to more reliably maintain the locked state of the valve body in the second position.

According to a third feature of the present invention, in addition to the first or second feature, a position where pivoting of the drive lever is stopped after the center of the first connecting shaft moves to the other side of the dead point on the straight line is adjustable.

With the third feature of the present invention, by adjusting the position at which the drive lever stops, it is possible to adjust the amount by which the center of the first connecting shaft moves to the other side of the dead point on the straight line.

According to a fourth feature of the present invention, there is provided an engine intake control system in which an intake manifold is formed from a surge chamber communicating with an air inlet, a first intake passage that bypasses one side wall of the surge chamber and that has an upstream end portion and a downstream end portion opening in the surge chamber, and a second intake passage that has an upstream end portion opening in the surge chamber so as to oppose the downstream end portion of the first intake passage across a gap and a downstream end portion connected to an intake port of an engine, a sleeve-shaped valve body is slidably fitted around one of the opposing end portions, that is, the first intake passage end portion, of the first and second intake passages, the valve body moving between a first position in which the valve body is distanced from the other of the opposing end portions, that is, the second intake passage end portion, and a second position in which the valve body is in contact with the second intake passage end portion, and an actuator is connected to the valve body via a valve operating system, wherein the valve operating system comprises a drive shaft that is rotatably supported on the intake manifold and connected to the actuator, a drive lever that is fixedly provided on the drive shaft and can pivot in a direction of movement of the valve body, a follower arm that is fixedly provided on the valve body, a link, a first connecting shaft that pivotably connects one end of the link and the drive lever, and a second connecting shaft that pivotably connects the other end of the link and the follower arm; in response to a movement of the valve body from the first position to the second position by pivoting of the drive lever, a center of the first connecting shaft approaches from one side a straight line connecting two centers of the drive shaft and the second connecting shaft, and after the valve body reaches the second position, further pivoting of the drive lever is carried out through a predetermined angle so that the center of the first connecting shaft moves to the other side of a dead point on the straight line.

With the fourth feature of the present invention, in a state in which the valve body is moved to the second position by the output of the actuator and the valve body is locked in this position by the valve operating system, it is possible to eliminate or reduce the output of the actuator, thus greatly reducing the load on the actuator. Moreover, when the valve body is in the second position, the first and second intake passages are in an uninterruptedly continuous state, the interior of the intake manifold attains a low speed intake mode suitable for low speed running, and since this low speed intake mode is very frequently used when the engine is running, the load on the actuator can be still further reduced, thus serving for energy saving.

According to a fifth feature of the present invention, in addition to the fourth feature, at least one of abutment parts of the valve body and the second intake passage end portion abutting against each other in the second position of the valve body is formed from a resilient member, and the resilient member is compressively changed in shape in response to movement of the center of the first connecting shaft to the other side of the dead point on the straight line.

The resilient member corresponds to the funnel member 4a in the embodiment of the present invention, which will be described below.

With the fifth feature of the present invention, as the center of the first connecting shaft moves to the other side of the dead point on the straight line, the force of repulsion of the resilient member from the compression acts on the drive lever, thus suppressing uncontrolled movement thereof, and it is thus possible to more reliably maintain the locked state of the valve body in the second position.

A mode for carrying out the present invention is explained below by reference to an embodiment of the present invention shown in the attached drawings.

DESCRIPTION OF THE PREFERRED EMBODIMENT

Figure 1:
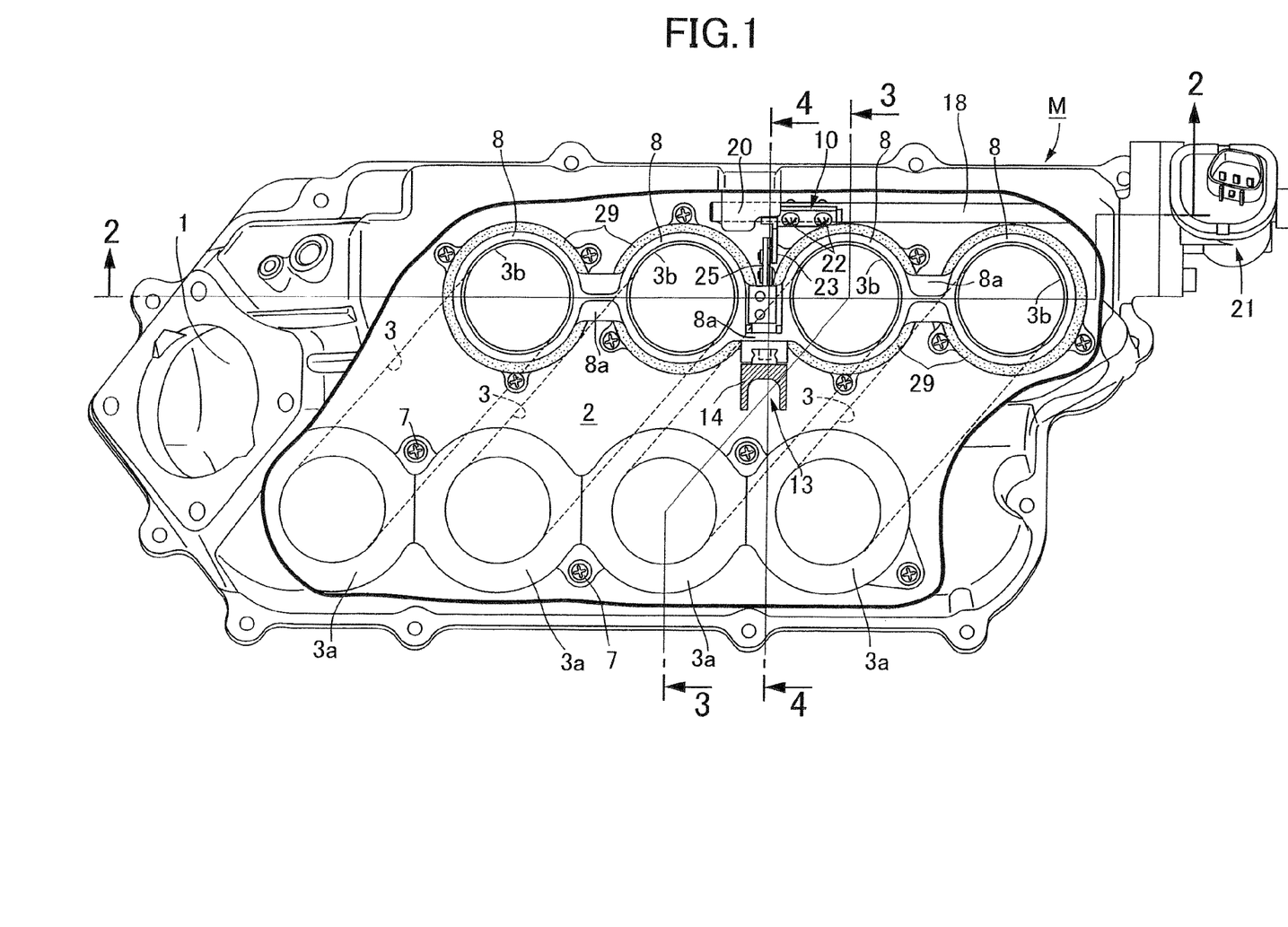
FIG. 1 is a partially cutaway plan view of an intake manifold comprising the valve operating system of the present invention.
Figure 2:
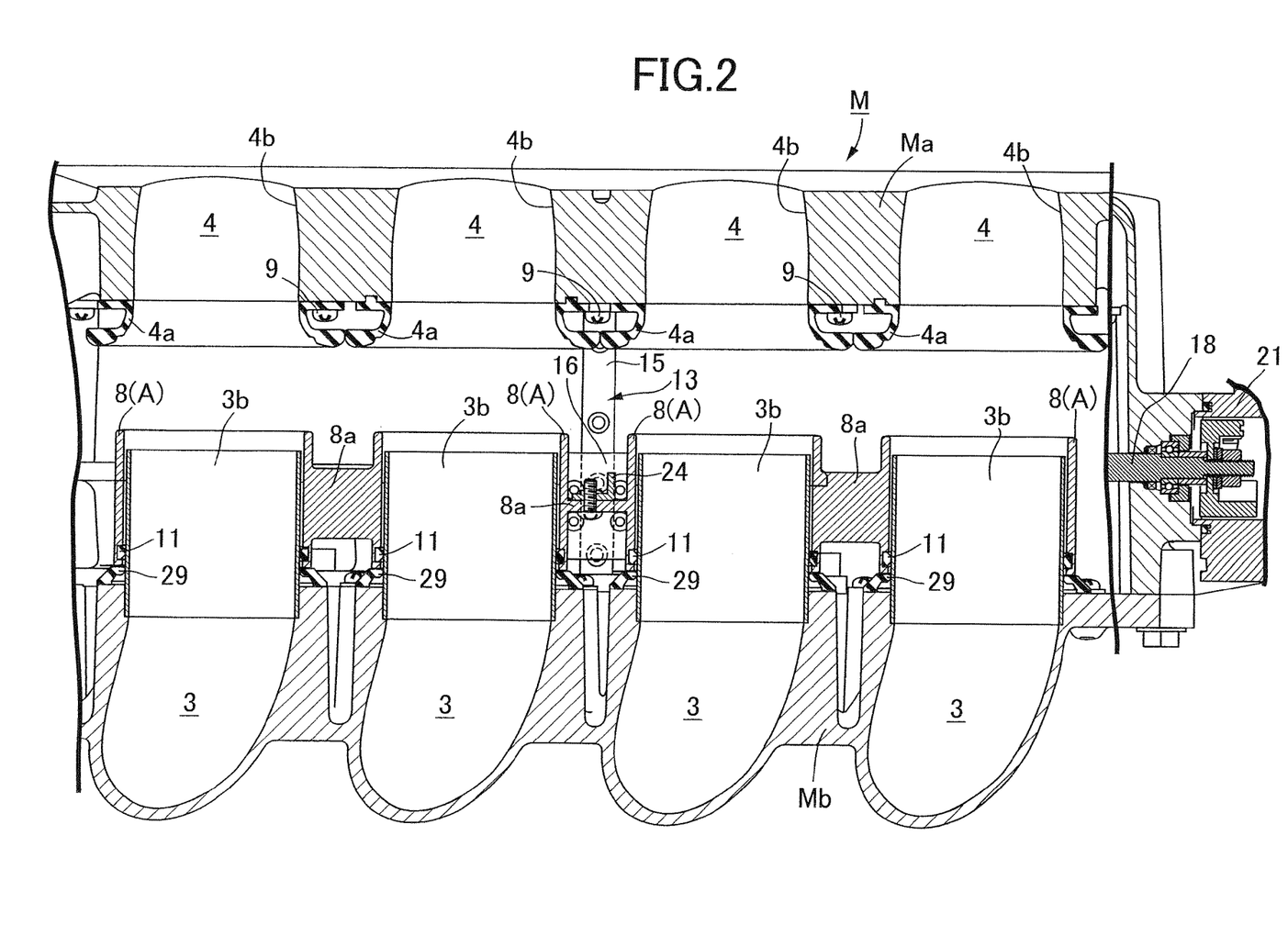
FIG. 2 is a sectional view along line 2-2 in FIG. 1 (showing a state in which a valve body is in a first position).
Figure 3:
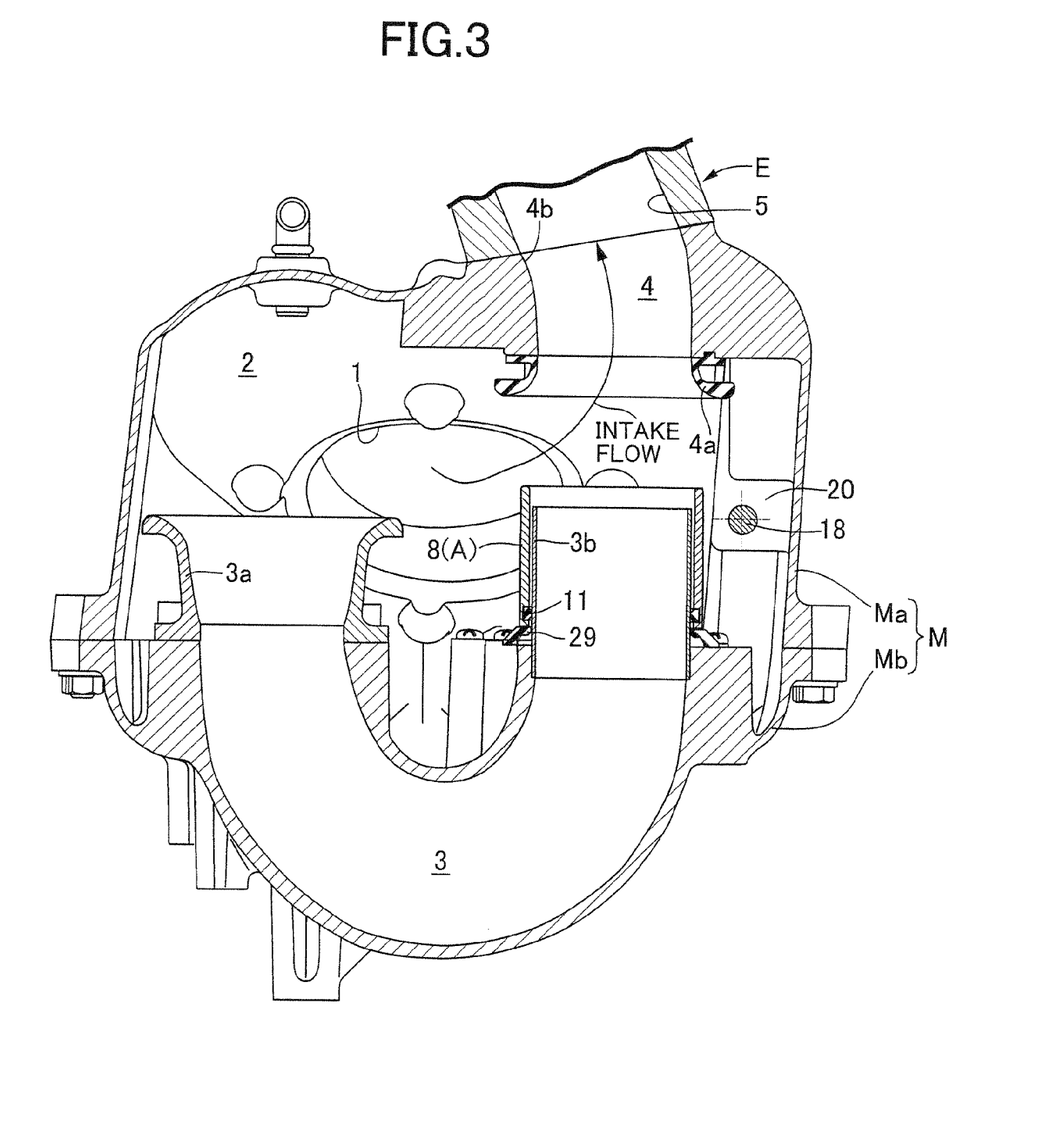
FIG. 3 is a sectional view along line 3-3 in FIG. 1 (showing a state in which the valve body is in the first position).

Firstly, in FIG. 1 to FIG. 3, reference symbol M denotes an intake manifold of a four-cylinder engine E; the intake manifold includes a surge chamber 2 having an air inlet 1 at its upper end, four parallel first intake passages 3 that bypass part of a lower wall of the surge chamber 2 and that have an upstream end portion 3a and a downstream end portion 3b opening in the surge chamber 2, and four parallel second intake passages 4 passing through an upper wall of the surge chamber 2, an upstream end portion 4a of the second intake passage 4 opposing the downstream end portion 3b of the first intake passage 3 across a gap. This intake manifold M is mounted on one side face of a cylinder head of the engine E, and a downstream end portion 4b of the second intake passage 4 is connected to an intake port 5 of the engine E. A throttle body (not illustrated) for regulating the amount of intake air of the engine E is mounted on the air inlet 1.

The intake manifold M is divided into an upper block Ma and a lower block Mb along a dividing plane in the middle of the surge chamber 2. The upper block Ma includes an upper half of the surge chamber 2 and the group of second intake passages 4, and is made of a light alloy or a synthetic resin, the lower block Mb includes a lower half of the surge chamber 2 and the group of first intake passages 3 and is made of a light alloy or a synthetic resin, and these two blocks Ma and Mb are joined via a plurality of bolts or are connected together by vibration welding.

In the surge chamber 2, the mutually opposing downstream end portion 3b of the first intake passage 3, which has an upward-facing attitude, and upstream end portion 4a of the second intake passage 4, which has a downward-facing attitude, have a gap opened therebetween, and the two are disposed so as to oppose each other across the gap. Hereinafter, the downstream end portion 3b of the first intake passage 3 is called the first intake passage end portion 3b, and the upstream end portion 4a of the second intake passage 4 is called the second intake passage end portion 4a. A valve body 8 is provided between the first and second intake passage end portions 3b and 4a, the valve body 8 providing continuity therebetween or opening the second intake passage end portion 4a to the surge chamber 2. The first intake passage end portion 3b is formed in a straight shape, and the second intake passage end portion 4a is formed from a funnel member 4a secured to a lower face of the upper block Ma via a screw 9 and arranged coaxially with the first intake passage end portion 3b, this funnel member 4a being molded using a resilient material such as rubber. Furthermore, the upstream end portion 3a of the first intake passage 3 is also formed from a funnel member 3a secured to a base face of the lower block Mb via a screw 7.

Figure 7:
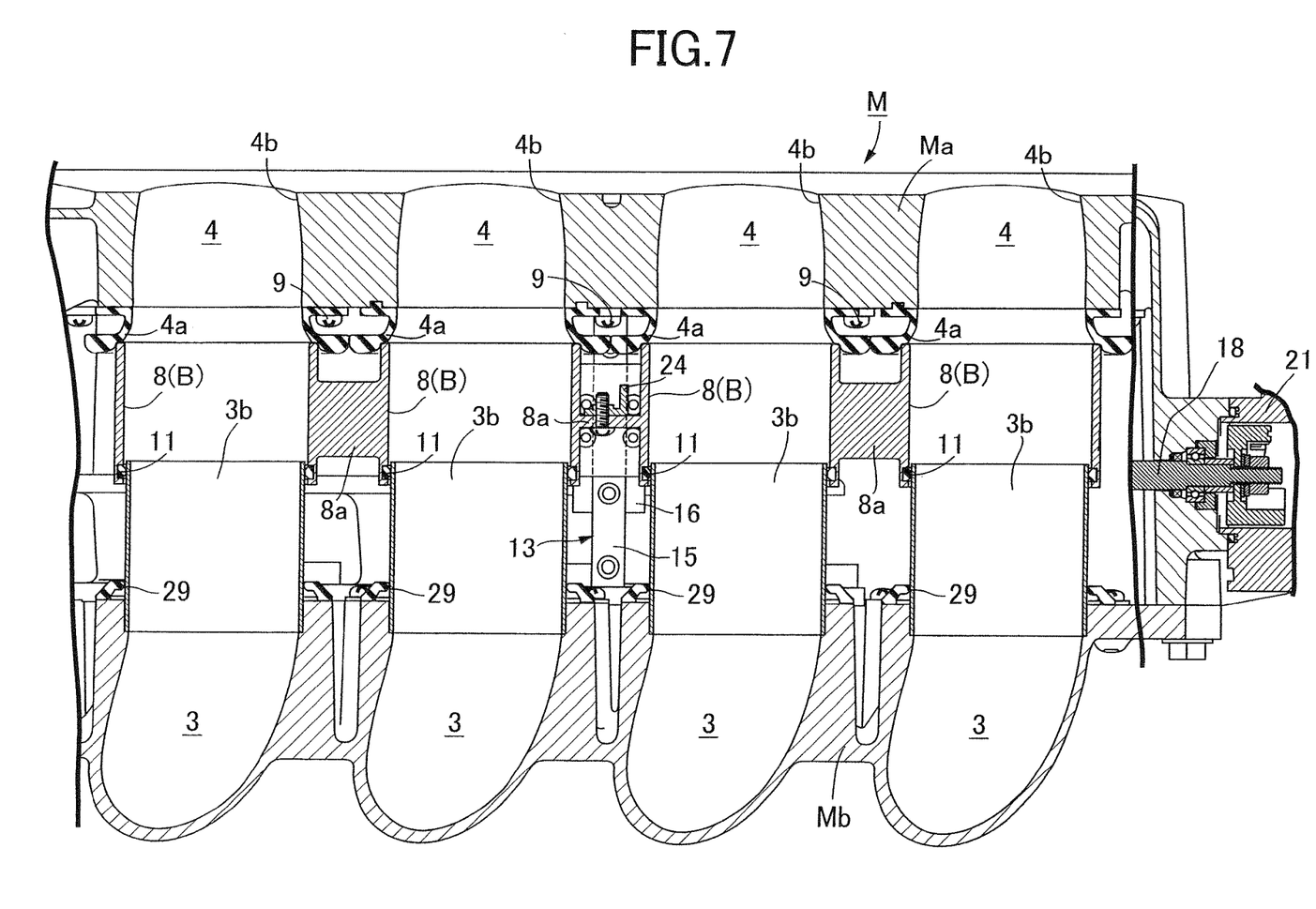
FIG. 7 is a view, corresponding to FIG. 2, showing a state in which the valve body is in the second position.
Figure 8:
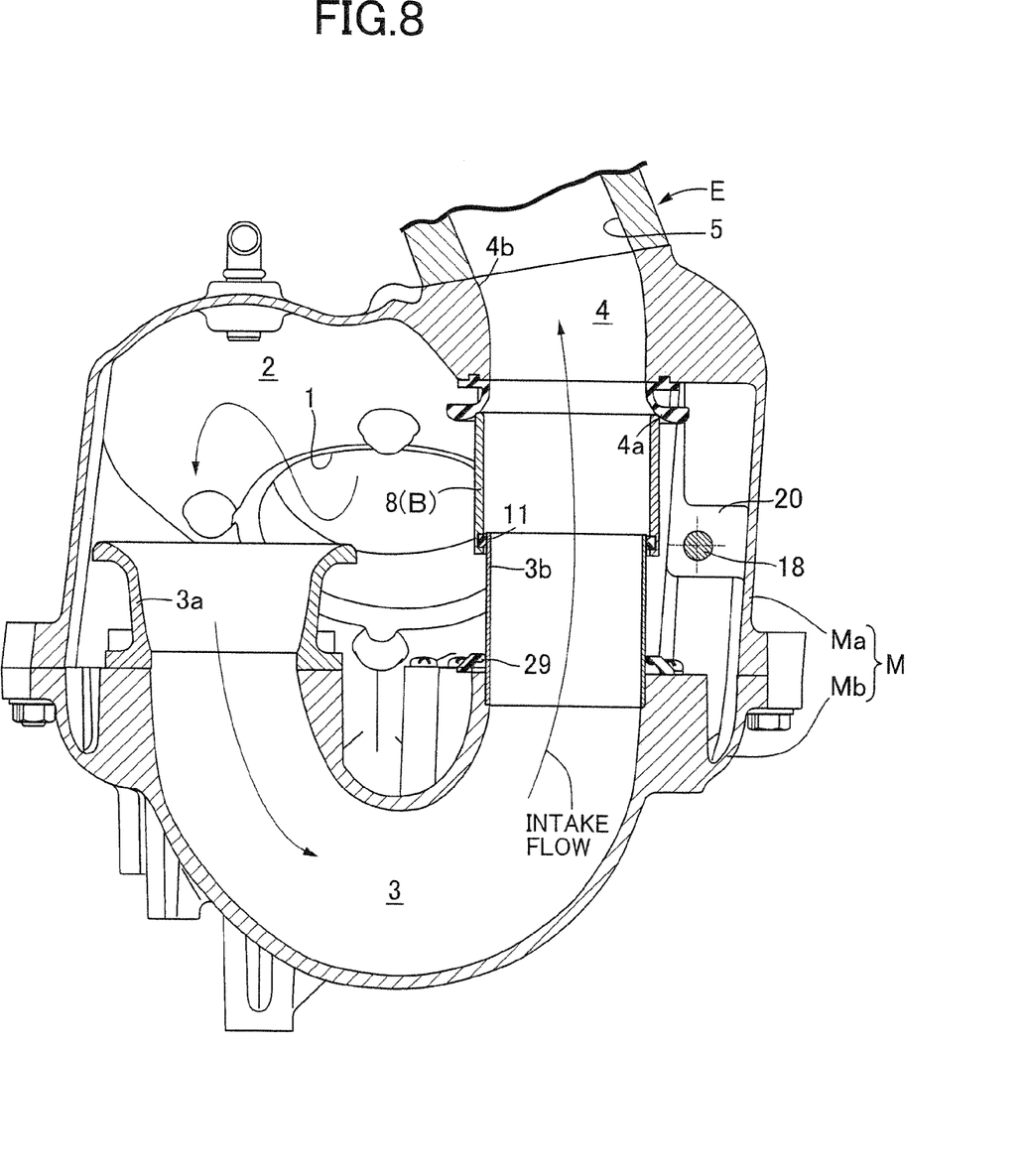
FIG. 8 is a view, corresponding to FIG. 3, showing a state in which the valve body is in the second position.

As shown in FIG. 2 and FIG. 3, the valve body 8 is formed in a sleeve shape that is axially slidably fitted around an outer peripheral face of the first intake passage end portion 3b, and an annular seal member 11 is attached to the inner periphery of the valve body 8, the seal member 11 being in slidable intimate contact with the outer peripheral face of the first intake passage end portion 3b. Four of the valve bodies 8 are integrally connected to each other via bridges 8a to thus form four connected valve bodies 8. Each valve body 8 can move between a first position A (see FIG. 2 and FIG. 3) in which it is distanced downward from the second intake passage end portion 4a and the second intake passage end portion 4a opens into the surge chamber 2, and a second position B (see FIG. 7 and FIG. 8) in which the upper end of the valve body 8 is in intimate contact with the second intake passage end portion 4a to thus provide continuity between the first and second intake passage end portions 3b and 4a, and in order to define the first position A for the valve body 8 a lower limit stopper 29 made of a resilient material is installed to receive the lower end of the valve body 8.

Figure 9:
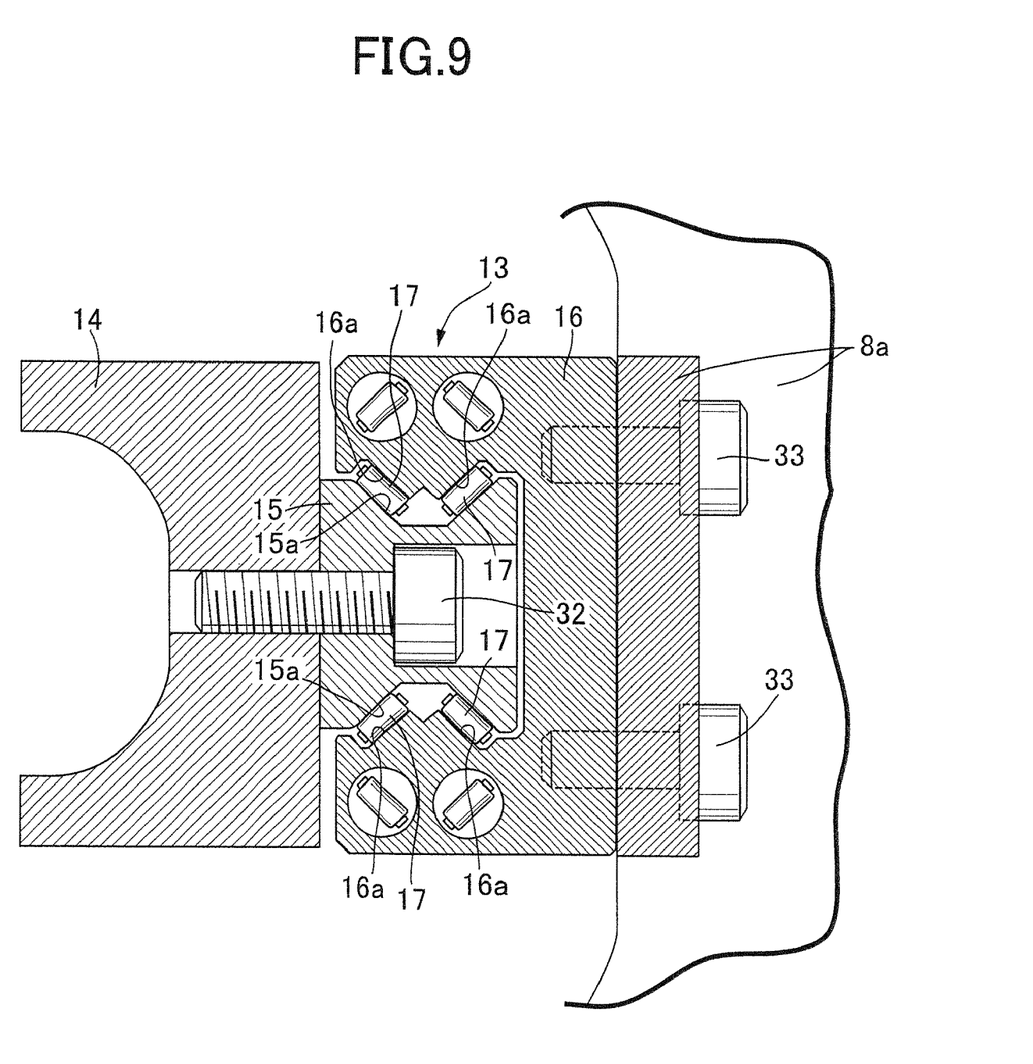
FIG. 9 is a sectional view along line 9-9 in FIG. 5.

As shown in FIG. 1, FIG. 4, FIG. 5, and FIG. 9, a linear motion guide bearing system 13 is provided between the intake manifold M and the four connected valve bodies 8, the linear motion guide bearing system 13 smoothly guiding linear movement of the valve body 8 between the first and second positions A and B. This linear motion guide bearing system 13 includes a high rigidity support post 14 that is secured to the upper block Ma via a bolt 31 so as to extend along a direction of movement of the valve body 8 and that is disposed on one side of a central part of the four connected valve bodies 8, a rail 15 secured to a front face of the support post 14 via a plurality of bolts 32 so as to extend along the direction of movement of the valve body 8, and a slider 16 movably straddle-mounted on the rail 15, and this slider 16 is secured to the bridge 8a in the central part of the four connected valve bodies 8 (hereinafter, called the central bridge) via bolts 33. As shown in FIG. 9, a plurality of roller rolling grooves 15a and 16a are formed on opposing faces of the rail 15 and slider 16 so as to extend in the longitudinal direction of the rail 15, and these roller rolling grooves 15a and 16a are filled with a large number of rollers 17 in multiple rows.

The linear motion guide bearing system 13 is disposed so that at least one part thereof is put between the two valve bodies 8 connected by the central bridge 8a.

A valve operating system 10 for operating the valve body 8 is explained by reference to FIG. 1, and FIG. 4 to FIG. 6. As shown in FIG. 1, a drive shaft 18 is disposed in the surge chamber 2 along the direction in which the four connected valve bodies 8 are arranged and on the opposite side of the four connected valve bodies 8 to the linear motion guide bearing system 13, and this drive shaft 18 is rotatably supported by one side wall of the upper block Ma and a support wall 20 projecting toward the surge chamber 2 side from the upper block Ma. An actuator 21 mounted on the outside face of the upper block Ma is connected to the outer end of the drive shaft 18 so as to enable the drive shaft 18 to rotate back and forth. Any type of actuator, such as an electrically-driven type, an electromagnetic type, or a negative pressure type is available as this actuator 21.

Figure 4:
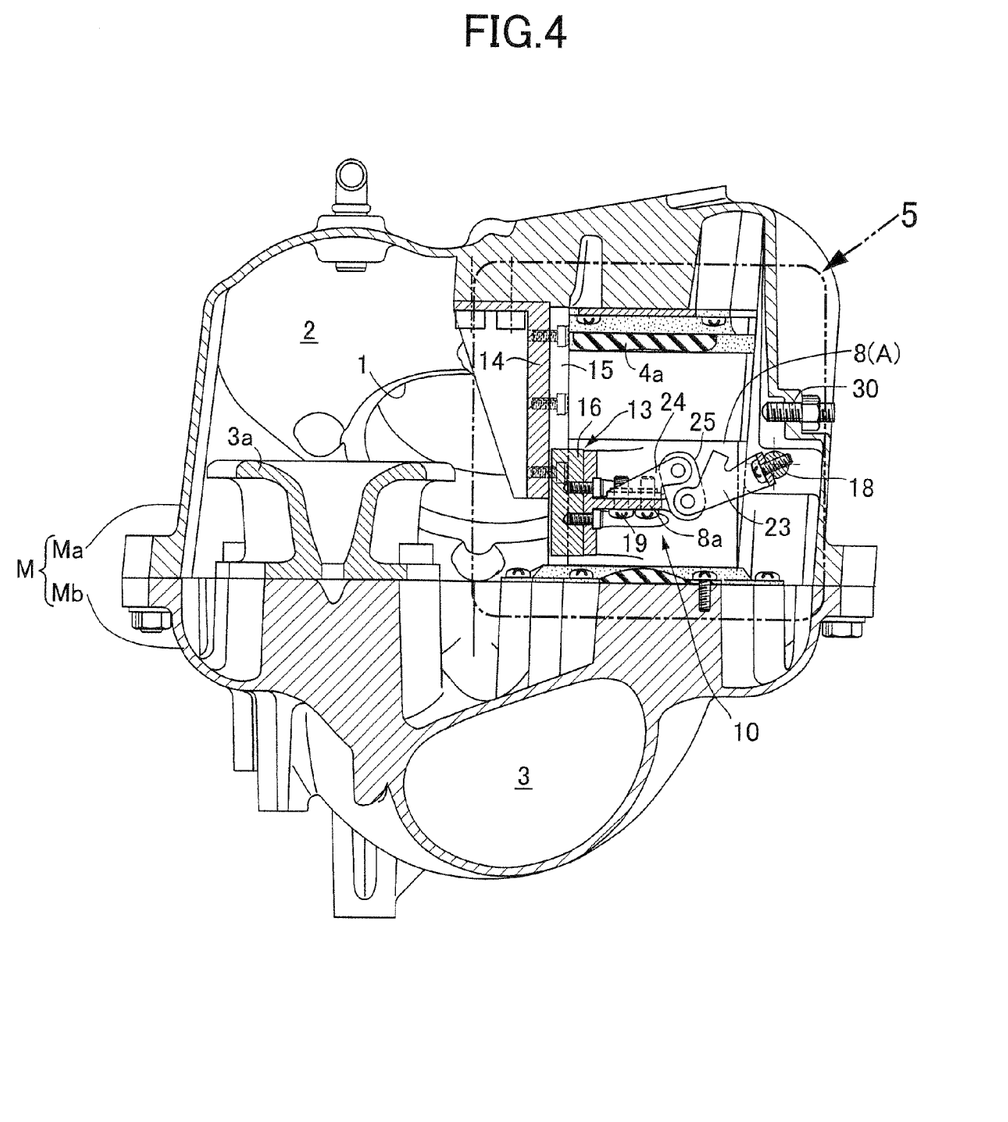
FIG. 4 is a sectional view along line 4-4 in FIG. 1 (showing a state in which the valve body is in the first position).

As clearly shown in FIG. 1 and FIG. 4, a drive lever 23 projecting toward the central bridge 8a is provided, fixed by a bolt 22, on a portion of the drive shaft 18 in proximity to the support wall 20.

On the other hand, a follower arm 24 projecting toward the drive lever 23 is fixedly provided on the central bridge 8a (see FIG. 4), and the drive lever 23 and the follower arm 24 are connected via a link 25. In this arrangement, one end of the link 25 is relatively pivotably connected to an extremity of the drive lever via a first connecting shaft 26, and the other end of the link 25 is relatively pivotably connected to an extremity of the follower arm 24 via a second connecting shaft 27. The valve operating system 10 is thus connected, together with the linear motion guide bearing system 13, to the central bridge 8a.

The drive lever 23, the follower arm 24, and the link 25 are arranged as follows. That is, when the valve body 8 is moved from a first position A shown in FIG. 5 to a second position B shown in FIG. 6 by pivoting of the drive lever 23, the center 26c of the first connecting shaft 26 approaches from below a straight line 28 connecting two centers 18c and 27c of the drive shaft 18 and the second connecting shaft 27, and after the valve body 8 reaches the second position B where it abuts against the second intake passage end portion 4a, that is, the funnel member 4a, the drive lever 23 is further pivoted through a predetermined angle, and the center 26c of the first connecting shaft 26 is made to move above the dead point on the straight line 28 while the funnel member 4a, which is a resilient body, is compressively changed in shape. When the center 26c of the first connecting shaft 26 moves above the dead point on the straight line 28, the valve body 8 is locked in the second position B, thus preventing it from moving toward the first position A side due to its own weight or vibration.

Figure 5:
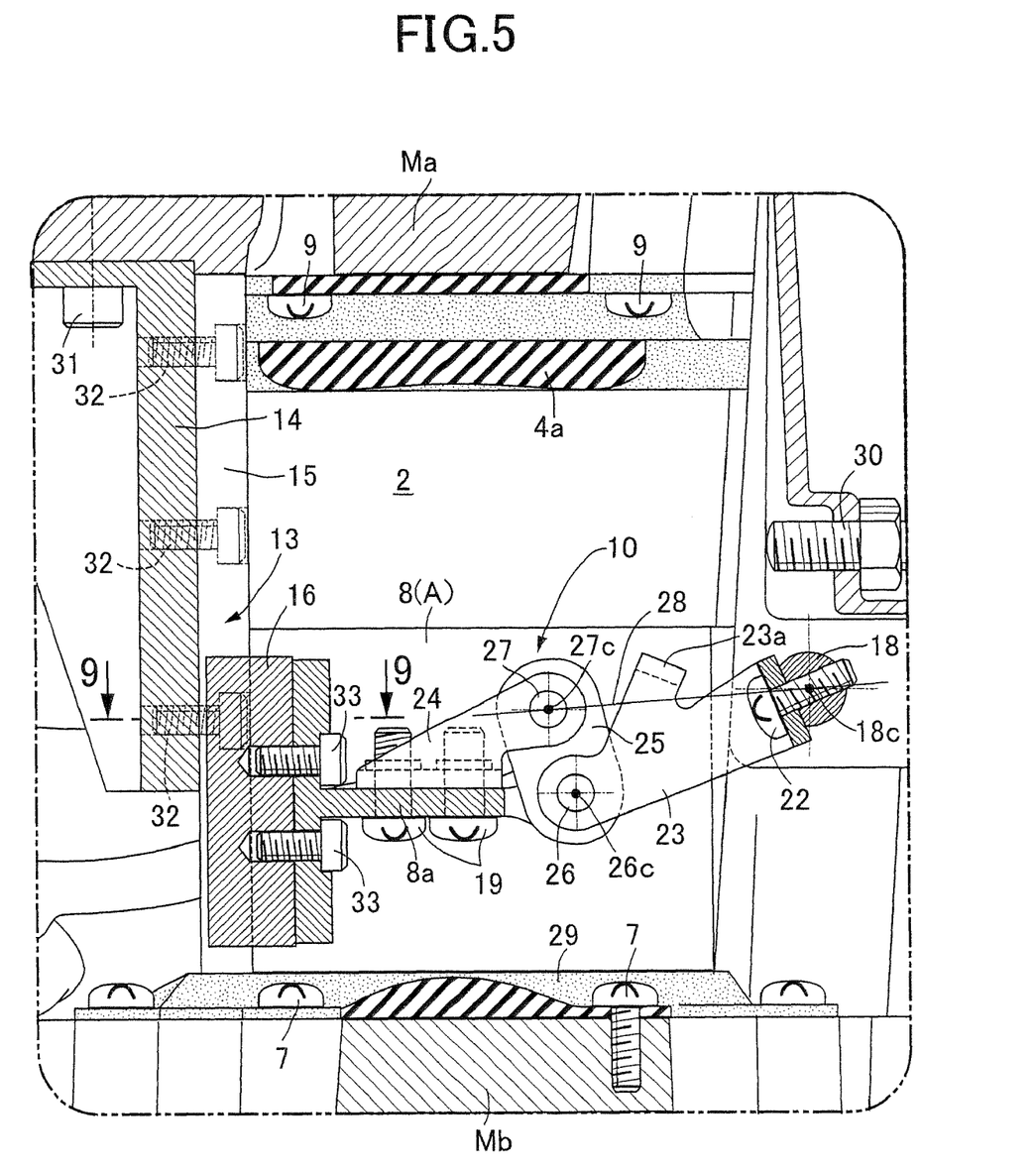
FIG. 5 is an enlarged view of part 5 in FIG. 4.
Figure 6:
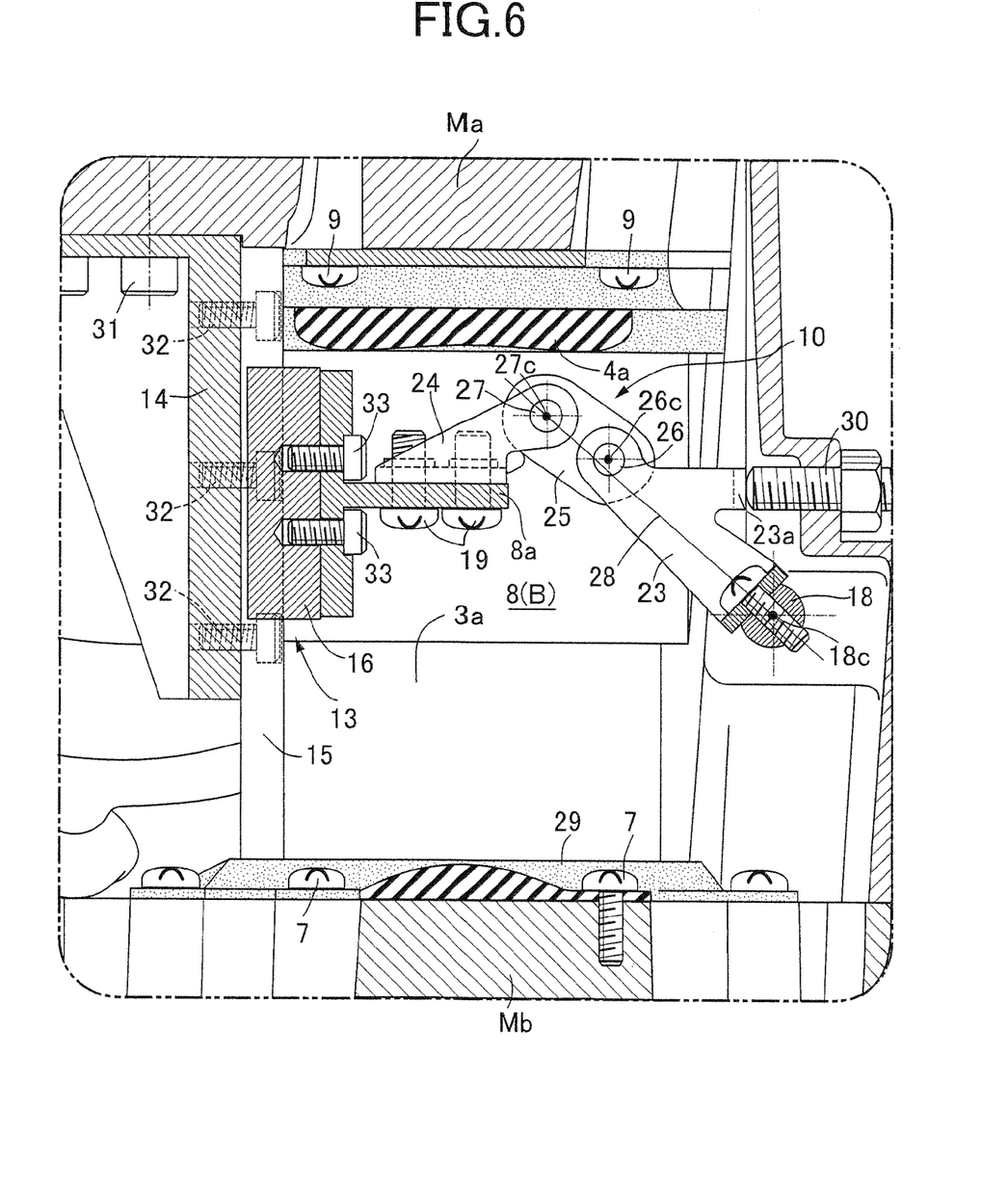
FIG. 6 is a view, corresponding to FIG. 5, showing a state in which the valve body is in a second position.

Further pivoting the drive lever 23 through the predetermined angle after the valve body 8 reaches the second position B means that pivoting of the drive lever 23 is stopped when it has pivoted through the predetermined angle, and in order to stop the pivoting, a stopper bolt 30 for receiving a stopper arm 23a integral with the drive lever 23 is adjustably screwed into the upper block Ma.

The operation of this embodiment is explained.

When the engine E is running at high speed, pivoting the drive lever 23 downward in FIG. 5 by the output of the actuator 21 via the drive shaft 18 allows the valve body 8 to be held in the first position A where it abuts against the lower limit stopper 29. In this state, the center 26c of the first connecting shaft 26 is positioned on the lower side of the straight line 28 connecting the two centers 18c and 27c of the drive shaft 18 and the second connecting shaft 27, and the weight of the valve body 8 works so as to press the valve body 8 against the lower limit stopper 29. It is thus possible to hold the valve body 8 in the first position A with a small output of the actuator 21, thereby preventing vibration of the valve body 8.

Since the valve body 8 held in the first position A in this way is distanced from the funnel-shaped second intake passage end portion 4a, in the second intake passage 4 the second intake passage end portion 4a opens directly in the surge chamber 2. Therefore, in an intake stroke of each cylinder of the engine E, air having a flow rate controlled by the throttle body (not illustrated) flows into the surge chamber 2 from the air inlet 1 as shown in FIG. 3, and is taken immediately into the engine E through the short second intake passage 4. The interior of the intake manifold M thus attains a high speed intake mode that is suitable for high speed running, charging efficiency is enhanced by effectively utilizing an intake pulsation effect, and the high speed output performance of the engine E can be improved. In particular, since the inlet of the second intake passage 4, that is, the second intake passage end portion 4a, has a funnel shape, the flow of intake air into the second intake passage 4 becomes smooth, and the intake efficiency can be enhanced.

When the engine E is running at low speed, by pivoting the drive lever 23 upward, which is opposite to the above, with the output of the actuator 21 via the drive shaft 18, the valve body 8 is held in the second position B shown in FIG. 6. That is, the valve body 8 is held in a state in which it is in intimate contact with the inner peripheral face of the second intake passage end portion 4a, which is formed from the resilient funnel member, and since this valve body 8 gives an uninterruptedly continuous state between the first and second intake passages 3 and 4, in the intake stroke of each cylinder of the engine E, air having a flow rate controlled by the throttle body (not illustrated) flows into the surge chamber 2 from the air inlet 1 and is supplied to the engine E through a long passage formed from the first and second intake passages 3 and 4 and the valve body 8. Therefore, the interior of the intake manifold M attains a low speed intake mode that is suitable for low speed running, charging efficiency is enhanced by effectively utilizing an intake inertia effect, and the low speed output performance of the engine E can be improved.

In the process in which upward pivoting of the drive lever 23 by the output of the actuator 21 makes the valve body 8 rise from the first position A to the second position B, as described above, in the second position B the valve body 8 causes the funnel member 4a, which is a resilient body, to be compressively changed in shape, the center 26c of the first connecting shaft 26 moves above the dead point on the straight line 28, and the drive lever 23 makes the stopper arm 23a abut against the stopper bolt 30 to thus stop pivoting thereof, thereby locking the valve body 8 in the second position B. Therefore, following this, even if the output of the actuator 21 is made zero or is greatly reduced, it is possible to prevent the valve body 8 from moving from the second position B due to its own weight or vibration.

Moreover, in the state in which the drive lever 23 abuts against the stopper bolt 30, since the downward force of repulsion of the funnel member 4a from the compression against the valve body 8 works as a load to press the drive lever 23 against the stopper bolt 30, it is possible to suppress uncontrolled movement of the drive lever 23, thus making the locked state of the valve body 8 in the second position B more reliable. The position at which the drive lever 23 is stopped is adjusted by forward and backward adjustment of the stopper bolt 30, and this enables the amount by which the center 26c of the first connecting shaft 26 moves to the other side of the dead point on the straight line 28 to be adjusted.

In this way, although the self weight of the valve body 8 works so as to lower it to the first position A, since it can be locked in the second position B, it is possible to make the output of the actuator 21 zero or greatly reduce it, thus greatly reducing the load on the actuator 21. Moreover, while a vehicle is running, since the low speed intake mode in which the valve body 8 is held in the second position B is frequently used, reduction of the load on the actuator 21 is more marked, thus greatly serving for energy saving.

In order to lower the valve body 8 from the second position B and return it to the first position A, the drive lever 23 may be pivoted downward by the output of the actuator 21, and the center 26c of the first connecting shaft 26 may be moved downward from the dead point on the straight line 28.

Since the linear motion guide bearing system 13 for guiding linear movement of the four connected valve bodies 8 between the first and second positions A and B is provided between the intake manifold M and the four connected valve bodies 8, the valve body 8 can move smoothly between the first and second positions A and B without galling against the first intake passage end portion 3b occurring, thus enhancing the responsiveness of operation. It is thus possible to control a sliding gap appropriately and easily, while lowering the precision of machining of sliding faces of the first intake passage end portion 3b and the valve body 8, and not only does this contribute to a reduction in cost due to improvement of productivity, but it is also possible to improve the responsiveness of operation due to the driving force for the valve body 8 decreasing and reduce the size of the actuator 21.

Moreover, even if the precision of machining of the sliding faces of the first intake passage end portion 3b and the valve body 8 is lowered, since the seal member 11 attached to the inner periphery of the valve body 8 is in intimate contact with the outer peripheral face of the first intake passage end portion 3b, when the valve body 8 is in the second position B where it abuts against the second intake passage end portion 4a, it is possible to reliably prevent air from leaking from the surge chamber 2 to the second intake passage 4 through the gap between the first intake passage end portion 3b and the valve body 8.

Furthermore, since the linear motion guide bearing system 13 includes the high rigidity support post 14 secured to the upper block Ma so as to extend along the direction of movement of the valve body 8 and disposed on one side of a central part of the four connected valve bodies 8, the rail 15 secured to the front face of the support post 14 so as to extend along the direction of movement of the valve body 8, and the slider 16 movably straddle-mounted on the rail 15 and secured to the central bridge 8a, and the slider 16 is put between the two valve bodies 8 connected by the central bridge 8a, the single linear motion guide bearing system 13 can be as close to the center of gravity of the four connected valve bodies 8 as possible; this enables the operating attitude of the four connected valve bodies 8 to be stabilized, and it is possible to avoid as far as possible any increase in the dimensions of the intake control system resulting from installation of the linear motion guide bearing system 13.

Furthermore, since the linear motion guide bearing system 13 and the valve operating system 10 are both connected to the central bridge 8a, it is possible to dispose the linear motion guide bearing system 13 and the valve operating system 10 in proximity to each other, the tilt moment of the four connected valve bodies 8 due to operation of the operating system 10 can be suppressed, and the function of the linear motion guide bearing system 13 can be enhanced, thus further serving for improvement in the responsiveness of operation of the four connected valve bodies 8.

The present invention is not limited to the above embodiment, and may be modified in a variety of ways as long as the modifications do not depart from the gist thereof. For example, the upstream end portion 4a of the second intake passage 4 may be formed in a cylindrical shape, and the valve body 8 may be slidably fitted around the outer peripheral face thereof so as to open and close the gap between the upstream end portion 4a and the downstream end portion 3b of the first intake passage 3. Furthermore, the present invention may also be applied to a single-cylinder engine as well as a multi-cylinder engine other than the above four-cylinder engine.

What is claimed is:

1. A valve operating system in which a valve body is mounted on a supporting member so as to move between predetermined first and second positions, and the valve body is operated by an actuator,
wherein the valve operating system comprises a drive shaft that is rotatably supported on the supporting member and connected to the actuator, a drive lever that is fixedly provided on the drive shaft and can pivot in a direction of movement of the valve body, a follower arm that is fixedly provided on the valve body, a link, a first connecting shaft that pivotably connects one end of the link and the drive lever, and a second connecting shaft that pivotably connects the other end of the link and the follower arm; in response to a movement of the valve body from the first position to the second position by pivoting of the drive lever, a center of the first connecting shaft approaches from one side a straight line connecting two centers of the drive shaft and the second connecting shaft, and after the valve body reaches the second position, further pivoting of the drive lever is carried out through a predetermined angle so that the center of the first connecting shaft moves to the other side of a dead point on the straight line.

2. The valve operating system according to claim 1, wherein a portion that abuts against the valve body so as to define the second position is formed resilient, and said portion is compressively changed in shape in response to movement of the center of the first connecting shaft to the other side of the dead point on the straight line.

3. The valve operating system according to claim 1 or 2, wherein a position where pivoting of the drive lever is stopped after the center of the first connecting shaft moves to the other side of the dead point on the straight line is adjustable.

4. An engine intake control system in which an intake manifold is formed from a surge chamber communicating with an air inlet, a first intake passage that bypasses one side wall of the surge chamber and that has an upstream end portion and a downstream end portion opening in the surge chamber, and a second intake passage that has an upstream end portion opening in the surge chamber so as to oppose the downstream end portion of the first intake passage across a gap and a downstream end portion connected to an intake port of an engine, a sleeve-shaped valve body is slidably fitted around one of the opposing end portions, that is, the first intake passage end portion, of the first and second intake passages, the valve body moving between a first position in which the valve body is distanced from the other of the opposing end portions, that is, the second intake passage end portion, and a second position in which the valve body is in contact with the second intake passage end portion, and an actuator is connected to the valve body via a valve operating system,     wherein the valve operating system comprises a drive shaft that is rotatably supported on the intake manifold and connected to the actuator, a drive lever that is fixedly provided on the drive shaft and can pivot in a direction of movement of the valve body, a follower arm that is fixedly provided on the valve body, a link, a first connecting shaft that pivotably connects one end of the link and the drive lever, and a second connecting shaft that pivotably connects the other end of the link and the follower arm; in response to a movement of the valve body from the first position to the second position by pivoting of the drive lever, a center of the first connecting shaft approaches from one side a straight line connecting two centers of the drive shaft and the second connecting shaft, and after the valve body reaches the second position, further pivoting of the drive lever is carried out through a predetermined angle so that the center of the first connecting shaft moves to the other side of a dead point on the straight line.

5. The engine intake control system according to claim 4, wherein at least one of abutment parts of the valve body and the second intake passage end portion abutting against each other in the second position of the valve body is formed from a resilient member, and the resilient member is compressively changed in shape in response to movement of the center of the first connecting shaft to the other side of the dead point on the straight line.

\* \* \* \* \*